US010957011B2

(12) United States Patent
Edwards et al.

(10) Patent No.: US 10,957,011 B2
(45) Date of Patent: *Mar. 23, 2021

(54) SYSTEM AND METHOD OF CAPTURING AND RENDERING A STEREOSCOPIC PANORAMA USING A DEPTH BUFFER

(71) Applicant: HIDDEN PATH ENTERTAINMENT, INC., Bellevue, WA (US)

(72) Inventors: David Edwards, Redmond, WA (US); Michael D. Smith, Duvall, WA (US)

(73) Assignee: HIDDEN PATH ENTERTAINMENT, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,920

(22) Filed: Jul. 3, 2019

(65) Prior Publication Data

US 2019/0325555 A1 Oct. 24, 2019

Related U.S. Application Data

(63) Continuation of application No. 15/724,770, filed on Oct. 4, 2017, now Pat. No. 10,346,950.

(Continued)

(51) Int. Cl.
*G06T 3/00* (2006.01)
*G06T 15/40* (2011.01)
(Continued)

(52) U.S. Cl.
CPC .......... *G06T 3/0087* (2013.01); *G06T 15/405* (2013.01); *H04N 13/122* (2018.05);
(Continued)

(58) Field of Classification Search
CPC . G06T 15/405; G06T 2215/16; G06T 3/0087; H04N 13/122; H04N 13/128; H04N 13/239; H04N 13/351; H04N 2013/0081
See application file for complete search history.

(56) References Cited

U.S. PATENT DOCUMENTS

| 4,503,433 A | 3/1985 | Tomasi |
| 5,175,616 A | 12/1992 | Milgram et al. |

(Continued)

FOREIGN PATENT DOCUMENTS

| EP | 2793187 A1 | 10/2014 |
| WO | 2015/085406 A1 | 6/2015 |

(Continued)

OTHER PUBLICATIONS

"Rendering anni-directional Stereo Content", Google, Inc., 11 pp.
(Continued)

*Primary Examiner* — Francis Geroleo
(74) *Attorney, Agent, or Firm* — Medler Ferro Woodhouse & Mills PLLC

(57) ABSTRACT

A system and method of capturing and rendering stereoscopic panoramic content is provided. The system may capture information from a virtual scene to generate a stereoscopic panorama in the form of a stereoscopic cube map. Using the pre-captured cube map, the system may render stereoscopic images during gameplay, image viewing, and/or playback of a three dimensional video. The system may capture camera distance information during capture for use in distortion reduction during image rendering and playback. The system may implement additional distortion reduction measures. Further, the system may use the capture camera distance information to write to depth buffers corresponding to rendered images for use when introducing dynamic gameplay elements into the scene. Additionally, the system may use realistic camera models to simulate human anatomy and reduce distortions associated with simplistic camera models.

19 Claims, 5 Drawing Sheets

Related U.S. Application Data

(60) Provisional application No. 62/404,449, filed on Oct. 5, 2016.

(51) Int. Cl.

| | | |
|---|---|---|
| *H04N 13/128* | (2018.01) | |
| *H04N 13/351* | (2018.01) | |
| *H04N 13/122* | (2018.01) | |
| *H04N 13/239* | (2018.01) | |
| *H04N 13/00* | (2018.01) | |

(52) U.S. Cl.
CPC ......... *H04N 13/128* (2018.05); *H04N 13/239* (2018.05); *H04N 13/351* (2018.05); *G06T 2215/16* (2013.01); *H04N 2013/0081* (2013.01)

(56) References Cited

U.S. PATENT DOCUMENTS

| | | | |
|---|---|---|---|
| 5,841,439 | A | 11/1998 | Pose et al. |
| 6,507,359 | B1 | 1/2003 | Muramoto et al. |
| 6,665,003 | B1 | 12/2003 | Peleg et al. |
| 6,791,598 | B1 | 9/2004 | Luken et al. |
| 6,795,109 | B2 | 9/2004 | Peleg et al. |
| 6,831,677 | B2 | 12/2004 | Peleg et al. |
| 7,176,960 | B1 | 2/2007 | Nayar et al. |
| 7,256,779 | B2 | 8/2007 | Donnelly |
| 7,791,638 | B2 | 9/2010 | McCutchen |
| 8,253,729 | B1 | 8/2012 | Geshwind |
| 8,503,765 | B2 | 8/2013 | Woo et al. |
| 8,553,942 | B2 | 10/2013 | Lynch |
| 8,953,023 | B2 | 2/2015 | Robinson |
| 9,288,476 | B2 | 3/2016 | Sandrew et al. |
| 2004/0001138 | A1 | 1/2004 | Weerashinghe et al. |
| 2011/0141227 | A1 | 6/2011 | Bigioi et al. |
| 2013/0250040 | A1 | 9/2013 | Vitsnudel et al. |
| 2014/0306958 | A1 | 10/2014 | Flack et al. |
| 2015/0321103 | A1 | 11/2015 | Barnett et al. |
| 2015/0358539 | A1 | 12/2015 | Catt |
| 2015/0363965 | A1 | 12/2015 | Wells et al. |
| 2016/0012633 | A1 | 1/2016 | Wei et al. |
| 2016/0050345 | A1 | 2/2016 | Longbotham et al. |
| 2016/0191687 | A1 | 6/2016 | Casas |
| 2017/0163970 | A1 | 6/2017 | Gronholm et al. |
| 2017/0295353 | A1 | 10/2017 | Hwang et al. |
| 2017/0295359 | A1 | 10/2017 | Cabral et al. |

FOREIGN PATENT DOCUMENTS

| | | |
|---|---|---|
| WO | 2015/183621 A1 | 12/2015 |
| WO | 2016/118745 A1 | 7/2016 |

OTHER PUBLICATIONS

Boos, Kevin et al., "Flashback: immersive Virtual Reality on Mobile Devices via Rendering Memoization", MobiSys'16, Jun. 25-30, 2016, Singapore, http://dx.doi.org/10.1145/2906388.2906418.

Nternational Search Report dated Jan. 23, 2018 in corresponding International Patent Application No. PCT/US2017/055101.

Written Opinion dated Jan. 23, 2018 in corresponding International Patent Application No. PCT/US2017/055101.

Search History dated Jan. 23, 2018 in corresponding International Patent Application No. PCT/US2017/055101.

Gurrieri et al., "Stereoscopic cameras for the real-time acquisition of panoramic 3D images and videos", School of Electrical Engineering and Computer Sciences, University of Ottawa, ON, Canada, Mar. 12, 2013, 17 pages, http://dx.doi.org/10.1117/12.2002129.

SYSTEM AND METHOD OF CAPTURING AND RENDERING A STEREOSCOPIC PANORAMA USING A DEPTH BUFFER

RELATED APPLICATIONS

This application is a continuation of U.S. application Ser. No. 15/724,770, filed Oct. 4, 2017, which claims benefit of provisional U.S. Appl. No. 62/404,449, filed Oct. 5, 2016, the disclosures of which are incorporated by reference herein in its entirety.

FIELD OF THE INVENTION

The invention relates to a system and method for capturing and rendering a stereoscopic panorama.

BACKGROUND OF THE INVENTION

Stereoscopic images provide to viewers the perception of viewing three dimensional images by showing offset versions of an image to the left and right eyes of a viewer. The images shown to each eye are rendered to mimic the different views captured by the left and right eyes of the viewer to provide the user the perception of viewing a three dimensional image. When combined with panorama rendering techniques, stereoscopic imaging techniques can provide to viewers the perception that they are immersed in a fully surrounding environment. Computational requirements associated with rendering the images of a stereoscopic panorama may be prohibitive for providing users rich gameplay or playback of panoramic videos without sacrificing image quality. The computational resource issue may be further exacerbated because mobile devices, with their small form factors, may provide an excellent display for showing stereoscopic images but lack the computational power of larger laptop and desktop machines. Further, conventional techniques may introduce distortions to the stereoscopic images, reducing realism and damaging the illusion of an immersive environment.

These and other drawbacks exist with conventional stereoscopic capture and render techniques.

SUMMARY OF THE INVENTION

The invention addressing these and other drawbacks relates to a system and method of capturing and rendering stereoscopic panoramic content. The system may pre-capture information from a virtual scene to generate a stereoscopic panorama data set. The stereoscopic panorama data set may be stored as a stereoscopic cube map including visual information and camera distance information. Using the generated stereoscopic panorama data set, the system may render stereoscopic images during gameplay, image viewing, and/or playback of a three dimensional video. The system may capture camera distance information during capture for use in distortion reduction during image rendering and playback. Further, the system may generate depth buffers corresponding to rendered images for use when introducing dynamic gameplay elements into scene. Additionally, the system may use realistic camera models to simulate human anatomy and reduce distortions associated with simplistic camera models.

According to an aspect of the invention, a computer implemented method of rendering stereoscopic images captured from virtual scene data for virtual reality display to a user is provided. The method may be implemented in a computer system having one or more physical processors programmed with computer program instructions that, when executed by the one or more physical processors, cause the computer system to perform the method. The method may comprise, obtaining, by the computer system, a stereoscopic panorama data set, the stereoscopic panorama data set including left camera visual data, left camera distance data, right camera visual data, and right camera distance data, establishing, by the computer system, a user camera model having a left camera and a right camera corresponding to a left eye and a right eye of the user, determining, by the computer system, a location, and a viewing angle of the user camera model, rendering, by the computer system, a left eye image according to the left camera visual data and the left camera distance data, based on the location, and the viewing angle of the user camera model, rendering, by the computer system, a right eye image according to the right camera visual data and the right camera distance data, based on the location, and the viewing angle of the user camera model, causing, by the computer system, the simultaneous display of the right eye image and the left eye image to produce a stereoscopic effect.

According to another aspect of the invention, a system of rendering stereoscopic images captured from virtual scene data for virtual reality display to a user is provided. The system may comprise a computer system including one or more physical processors programmed by computer program instructions that, when executed, cause the computer system to: obtain a stereoscopic panorama data set, the stereoscopic panorama data set including left camera visual data, left camera distance data, right camera visual data, and right camera distance data, establish a user camera model having a left camera and a right camera corresponding to a left eye and a right eye of the user, determine a location, and a viewing angle of the user camera model, render a left eye image according to the left camera visual data and the left camera distance data, based on the location, and the viewing angle of the user camera model, render a right eye image according to the right camera visual data and the right camera distance data, based on the location, and the viewing angle of the user camera model, and cause the display of the right eye image and the left eye image to produce a stereoscopic effect.

In another implementation of the invention, a system of capturing stereoscopic images captured from virtual scene data for virtual reality display to a user is provided. The system may include a computer system comprising one or more physical processors programmed by computer program instructions that, when executed, cause the computer system to: obtain virtual scene data and establish a capture camera model having a left camera corresponding to a left eye of the user, a right camera corresponding to a right eye of the user, a vertical axis of rotation located behind a camera plane, the camera plane intersecting with the left camera and the right camera, and the vertical axis of rotation equidistant to the left camera and the right camera, and a horizontal axis of rotation. The physical processors may be further programmed to determine a first orientation of the capture camera model, the first orientation specified by a first horizontal angle of the camera plane around the vertical axis of rotation and a first vertical angle of the camera plane around the horizontal axis of rotation, capture, in the first orientation, first left camera visual data, first left camera distance data, first right camera visual data, and first right camera distance data from the virtual scene data for a stereoscopic panorama data set, determine a second orientation of the capture camera model, the second orientation specified by a second horizontal angle of the camera plane around the vertical axis of rotation and a second vertical angle of the camera plane around the horizontal axis of rotation, and capture, in the second orientation, second left camera visual data, second left camera distance data, second right camera visual data, and second right camera distance data from the virtual scene data for a stereoscopic panorama data set.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of capturing a stereoscopic panorama and rendering stereoscopic images consistent with the panorama. The system may capture information from a virtual scene to generate a stereoscopic panorama in the form of a stereoscopic cube map. Using the pre-captured cube map, the system may render stereoscopic images during gameplay, image viewing, and/or playback of a three dimensional video. The system may capture camera distance information during capture for use in the reduction or elimination of distortion reduction during image rendering and playback. Further, the system may generate depth buffers corresponding to rendered images for use when introducing dynamic gameplay elements into scene. Additionally, the system may use realistic camera models to simulate human anatomy and reduce distortions associated with simplistic camera models.

In some implementations, the system may be used for play of immersive three dimensional video games. A virtual scene may be captured as one or more stereoscopic cube maps. The cube map may be used by an image rendering module to render stereoscopic images as the game is played. Information stored in the cube map may further be used to permit the introduction of dynamic game play elements with eliminated or reduced distortion.

In some implementations, the system may be used for playback of three dimensional videos and/or three dimensional images. Information from the video and/or the images may be captured by a capturing module as one or more stereoscopic cube maps for playback by an image rendering module.

In some implementations, the system may be used for virtual reality (VR) and/or augmented reality (AR) capture and playback. Panoramic VR and AR projections may be provided with respect to a user camera model, representative of a user position in a virtual world (in the case of VR) or the real world (in the case of AR). In some implementations, the user camera model may coincide with a position of a user avatar. User avatars may be generally humanoid in shape and physiology, and/or may be of entirely different shape and physiology. For example, a user avatar may include a dragon, a wolf, or other creature.

Although many of the implementations are described with reference to gameplay, it is recognized that the stereoscopic capture and rendering systems, methods, techniques, and apparatuses disclosed herein may be used in numerous other applications. Description of aspects of the invention with respect to gameplay is intended for exemplary purposes, and does not limited the scope of the invention.

Exemplary System Architecture

Figure 1:
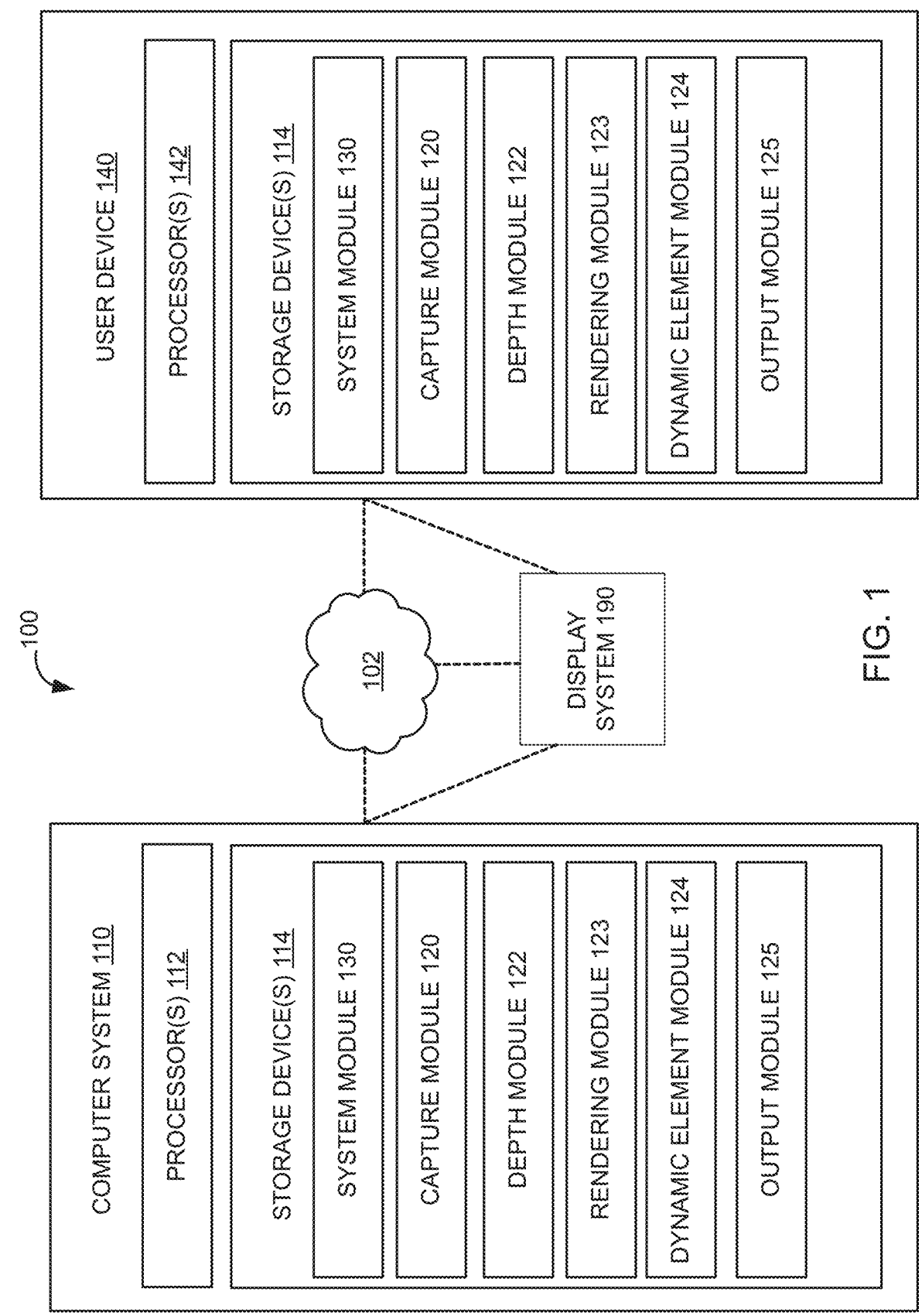
FIG. 1 illustrates a system for capture and rendering of a stereoscopic panorama, according to an implementation of the invention.

FIG. 1 illustrates a system 100 for capturing a stereoscopic panorama and rendering images consistent with the panorama. In one implementation, system 100 may include a computer system 110, a user device 140, a display system 190, and/or other components.

Computer System 110

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to capture a stereoscopic panorama and render images consistent with the panorama.

Computer system 110 may include one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by system module 130, capture module 120, depth module 122, rendering module 123, dynamic element module 124, output module 125, and/or other instructions that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Display System 190

Display system 190 may include a system with the capability of displaying stereoscopic images. Display system 190 may include one or more screens. Display system 190 may include computing devices, including memory storage modules and processors, configured to receive rendered images and display them on the one or more screens. Display system 190 may be a stand-alone device and/or may be a component connected to or otherwise associated with computer system 110 and/or user device 140. Display system 190 may, for example, be configured as a virtual reality headset device, including one screen for each eye, a single screen that may display left and right eye images simultaneously, a shutter system for alternately occluding the left and right eyes, and/or other stereoscopic display technologies. In some implementations, display system 190 may be a component of a handheld gaming device, a smartphone and/or a tablet computing device. As illustrated in FIG. 1, display system 190 may optionally be in communication with computer system 110, user device 140, and/or a network 102. In some implementations, a display system may include a television.

User Device 140

User device 140 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to capture a stereoscopic panorama and render images consistent with the panorama.

User device 140 may include one or more processors 142 (also interchangeably referred to herein as processors 142, processor(s) 142, or processor 142 for convenience), one or more storage devices 114, and/or other components. Processors 142 may be programmed by one or more computer program instructions. For example, processors 112 may be programmed by system module 130, capture module 120, depth module 122, rendering module 123, dynamic element module 124, output module 125, and/or other instructions that program computer system 110 to perform various operations, each of which are described in greater detail herein. As used herein, for convenience, the various instructions will be described as performing an operation, when, in fact, the various instructions program the processors 142 (and therefore user device 140) to perform the operation.

In implementations, some or all of the described modules of computer system 110 and user device 140 may operate on either unit to form a complete system. That is, computer system 110 and user device 140 may each carry out any or all of the operations described below and executed by the various computer software modules described herein. In some implementations, each of computer system 110 and user device 140 may include specific ones of the described modules, and may therefore carry out specific operations of the system.

For example, in some implementations, a computer system 110 may include a capture module 120 for generating a stereoscopic panorama data set, while user device 140 may include a system module 130, a depth module 122, a rendering module 123, and a dynamic element module 124, which may cooperate to render stereoscopic images associated with gameplay or video playback. Alternative implementations may be provided that include any or all of the above described modules operating on computer system 110 and/or user device 140 in any combination. Although the various modules are described below as operating on a computer system, other implementations that include the operation of all or some of the described modules on a separate system, such as user device 140, a cloud based system or other computer system capable of executing the modules may be utilized.

System Module 130

System module 130 may be a software module operation on computer system 110. System module 130 may include computer program instructions, that, when executed by processors 112, cause computer system 110 to perform the actions of a game, VR playback software, or other application. System module 130 may execute the tasks and operations of an application or game employing stereoscopic graphics and provide necessary information to the graphic modules of the system to produce appropriate computer images for display to a user. For example, system module 130 may process user inputs for controlling any or all aspects of video game play or video play back, including camera angles, user movement, object manipulation, etc.

Capture Module 120

Capture module 120 may be a software module operating on computer system 110. Capture module 120 may include programming instructions which may program the one or more processors 112 to carry out the described functionality of the capture module 120. Capture module 120 may capture omnidirectional or panoramic stereo content for virtual reality (VR) display via a head-mounted display. Capture module 120 may be used to capture a stereoscopic panorama from a virtual scene which may subsequently be rendered as stereoscopic images for viewing. Stereoscopic images may be rendered by a rendering module (described below) to provide display of an omni-directional stereoscopic panorama that fully surrounds a viewer.

As used herein, the term "stereoscopic" refers to computer graphics or images, that provide the illusion of depth or dimension by presenting different images of the same scene or object to the left and right eyes of the viewer. The two different images present offset views of the same scene or object, and attempt to mimic the different images that a viewer's left and right eyes would capture in a natural environment. Thus, for example, an offset between the images may be greater for an object that is intended to appear closer to the viewer, while objects intended to appear far away may have little or no offset. When viewed at the appropriate distance and angle, a viewer's brain combines the two images into a single image that is perceived as having three dimensions. Thus, a flat screen, when viewed properly, can appear to present an image having depth and dimension. When stereoscopic images are presented in an omni-directional or panoramic format, that is, completely surrounding the viewer, an immersive virtual reality experience may be generated. As used herein, the term "stereoscopic image" refers to a pair of images rendered in stereo, one for the left eye and one for the right eye.

Virtual scene data may be received or otherwise obtained by capture module 120. Capture module 120 may then capture a stereoscopic panorama data set from the virtual scene data. Virtual scene data may include any data representative of a computer graphical scene, including video game data, photographic data, video data, and others. Virtual scene data may be produced or otherwise obtained by system module 130 and transferred to capture module 120. The stereoscopic panorama data set may include all of the data necessary to render stereoscopic images representative of the virtual scene. Various formats may be used and remain consistent with the present disclosure.

In some implementations, capture module 120 may be configured to capture a stereoscopic panorama data set as a stereoscopic cube map from a virtual scene for use in virtual reality applications. A cube map is a tool that may be used for storing panoramic image information around a viewer. In operation, a viewer, represented by a camera model, is arranged at the center of a cube, and the environment of the viewer exists outside and surrounds the cube. The environment of the viewer may be projected on to each of the six faces of the cube during capture. Thus, a cube map may include image data for six faces and may provide a complete graphical capture of a surrounding environment from a specific location in space.

Stereoscopic cube maps, as discussed herein, may include a pair of cube maps, one for each eye, for a specific location in space. Each cube map may include both visual information and camera distance information for each graphic unit of the cube map. As used herein, visual information refers to data defining graphic units (e.g., texels, pixels) to be displayed, and may include any and all information required to display the graphic unit. This may include, for example, type of graphic unit, RGB (or other color system) values, texture values, location values, etc. Camera distance information for each texel may include a Euclidean distance between a predetermined point of the camera (e.g., a nodal point or a no-parallax point) and the graphic element. Thus, the stereoscopic cube map may include four distinct cube maps, a visual cube map for a left and right eye, and a distance cube map for a left and right eye. The stereoscopic cube map may be representative of an immersive view from a of a panorama defined by horizontal and vertical steps in orientation at a single capture camera model location. During rendering, the stereoscopic cube map may contain all of the information required to render an immersive stereoscopic panorama for a user based on the camera location selected for capture of the virtual scene.

While this disclosure refers to implementations of the present invention with respect to texels and pixels as basic graphic units, it should be appreciated that the invention is not limited to the use of texels and pixels, and may be implemented via other basic graphic units.

Figure 2:
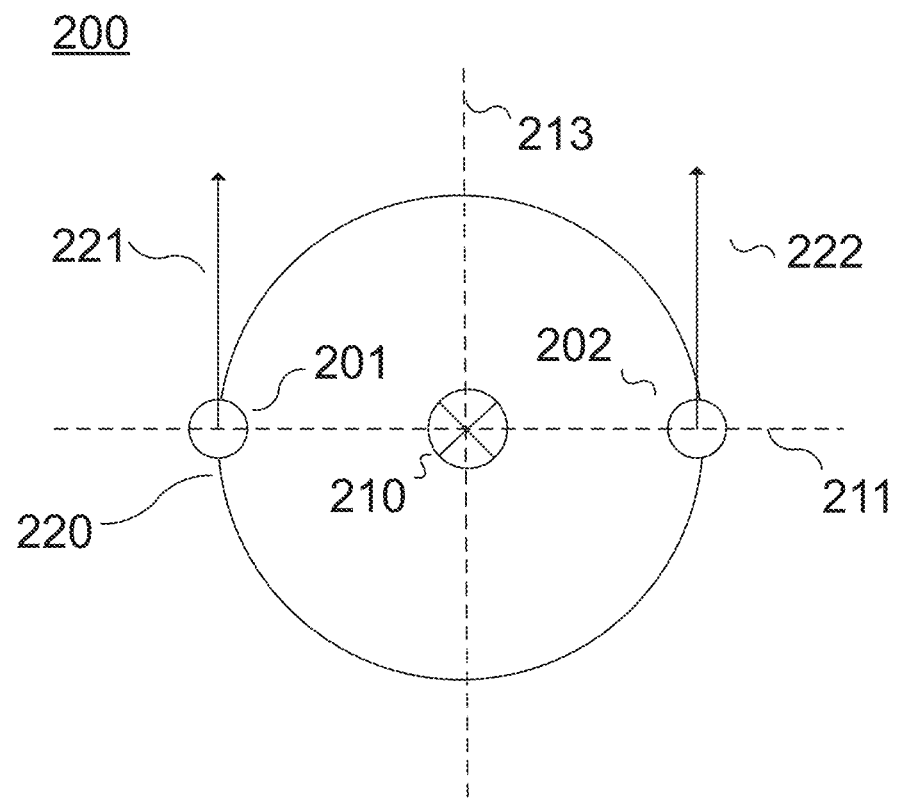
FIG. 2 illustrates a camera model according to an implementation of the invention.

Capture module 120 may use a camera model as a basis for one or more of camera location, rotation, movement and attitude when capturing a virtual scene. This model may be sometimes referred to as a capture camera model. As used herein, location refers to a baseline position of a capture camera model 200, e.g., a central point about which the capture camera model 200 rotates. Rotation of the capture camera model 200 refers to horizontal rotation about a vertical axis 210 and vertical rotation about a horizontal axis 211, respectively. Horizontal and vertical rotation are akin to the motions of turning a head side to side and up and down, respectively. Camera movement refers to a change in location from the baseline position of the capture camera model 200. Camera movement may include incremental movements representing only a small change in location. For example, a user's position may shift, e.g., by leaning their body, which may produce a small change in the camera location. Incremental camera movements may be representative of camera movement analogous to movement of an avatar's head that is not accompanied by an overall change in location of the avatar. Camera attitude refers to a rolling rotation about the roll axis 213. Changes in camera attitude may be akin to a tilting of the head of an avatar. Camera model information describing the camera model used for capture may be stored in association with or as part of a stereoscopic cube map. As used herein, the term "camera model" refers to the arrangement of left and right cameras used as capture points for a stereoscopic panorama. For example, in the basic capture camera model 200, as illustrated in FIG. 2, the left and right camera 201, 202 may be arranged at a predetermined intercamera distance apart, representative of an interpupillary distance of a viewer, with a vertex of rotation at a point directly between the cameras. The vertex of rotation may be a point through which two axes of rotation extend (e.g., vertical axis 210 and horizontal axis 211), as shown in FIG. 2. In some implementations, such as that illustrated in FIG. 3, and explained in greater detail below, a camera model 300 using camera positions that correspond to the anatomy of a human head may be used. Alternative camera models may also be used without departing from the scope of the invention. A left camera may capture the scene as it will be viewed by the left eye of a viewer and a right camera may capture a scene as it will be viewed by the right eye of the viewer. Information about a camera model, including intercamera distances and locations of rotational axes may be stored with or as part of a stereoscopic cube map.

FIG. 2 illustrates a camera model 200 according to an aspect of the invention. Left and right camera 201, 202 positioning may be defined by camera model 200. A camera model 200, as illustrated in FIG. 2, may include left and right cameras 201, 202 separated by an intercamera distance representative of an interpupillary distance. The camera model 200 may be representative of a user's head, and left and right cameras 201, 202 may be representative of left and right eyes of a user. Left and right cameras 201, 202 may rotate around a vertical axis 210 and a horizontal axis 211. The two axes may meet at a vertex of rotation located directly between the cameras. When the cameras 201, 202 are rotated, they may rotate along the path of rotation circle 220. View paths 221 and 222 represent lines of sight extending directly from left camera 201 and right camera 202.

Left camera 201 and right camera 202 are illustrated in FIG. 2 as circles. Left and right cameras 201, 202, however, are virtual cameras having no actual shape. This disclosure may refer to the location and orientation of cameras 201, 202, and other cameras. The location of a camera, 201, 202, as used herein, refers to the point location at which all viewing paths observable by the camera intersect. The orientation of cameras 201, 202, as used herein, refers to the direction of view paths 221 and 222, which represent the central viewing path of all viewing paths observable by the camera. View paths 221, 222 extend from the point location of cameras 201, 202 respectively, perpendicular to a camera plane 290 (not shown) defined by a plane intersecting the point locations of cameras 201, 202. Camera plane 290 is perpendicular to the view shown and intersects with horizontal axis 211, and is thus represented in FIG. 2 by the same dashed line representing horizontal axis 211. In a baseline position, the camera plane 290 intersects and is parallel to vertical axis 210, and thus has a horizontal angle of 0 degrees, where the horizontal angle is defined as an angle between the camera plane and the horizontal axis. In the baseline position, the camera plane intersects and is parallel to the horizontal axis, and has a vertical angle of 0 degrees, where the vertical angle is defined as an angle between the camera plane and the vertical axis. Rotation of the camera model 200 about either the vertical axis 210 or the horizontal axis 211 includes rotation of the camera plane.

Basic camera model 200 may be described by camera model parameters, including the intercamera distance, the vertical angle, and the horizontal angle. The vertical angle may represent an angle of the camera model as rotated around horizontal axis 211, while the horizontal angle may represent an angle of the camera model as rotated around a vertical axis 210. Rotation of the camera model causes view paths 221 and 222 to move in a corresponding fashion, as they remain perpendicular to the camera plane 290.

A stereoscopic panorama captured by basic camera model 200 may include distortions in the stereoscopic panorama when it is rendered. When compared to human anatomy, a vertex of rotation located directly between the left and right camera 201, 202 would correspond to a rotation point at the bridge of a person's nose. When a human turns their head, it does not rotate about the bridge of the nose, but around an axis located behind the eyes. Similarly, when a person looks up and down, the head also does not rotate around an axis passing through the eyes, but around an axis located much lower.

Figure 3B:
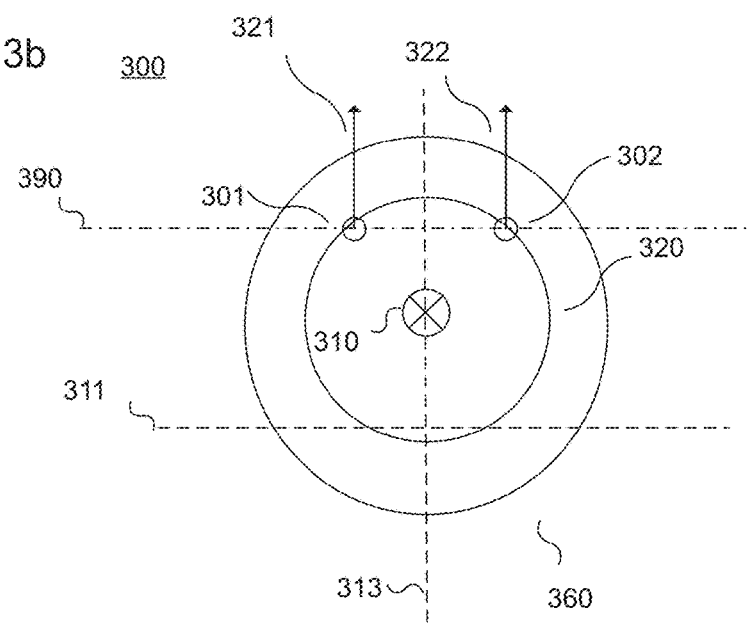
FIGS. 3a and 3b illustrates a camera model according to an implementation of the invention.
Figure 3A:
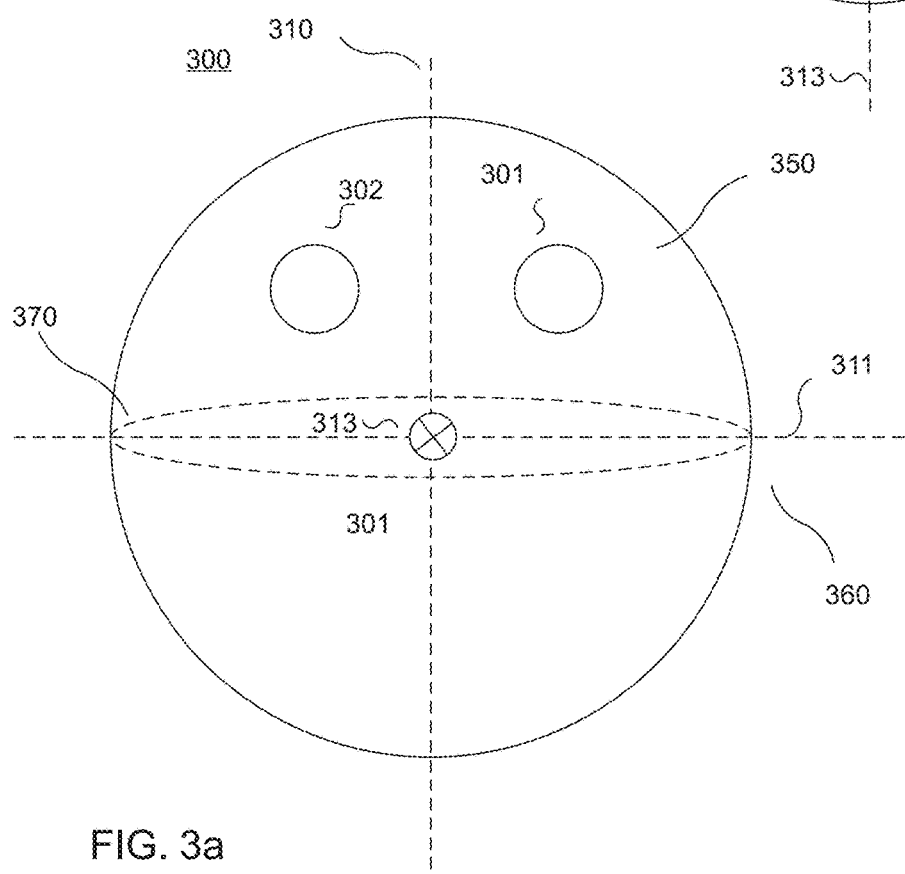

FIGS. 3a and 3b illustrate a camera model 300 corresponding to human anatomy. FIG. 3a illustrates a view of camera model 300 wherein the camera plane 390 (not shown in FIG. 3a) is parallel to the drawing page, i.e., a front view facing out from the page. FIG. 3b illustrates a camera model 300 wherein the camera plane 390 is perpendicular to the drawing page, i.e., a top view. In some implementations, camera model 300 corresponding to human anatomy may be implemented as follows. The camera model 300 may include a sphere 360 on which the left camera 301 and right camera 302 are located, in the top hemisphere 350 at a predetermined intercamera distance from one another. The intercamera distance may be measured as a straight line distance between the point locations of left camera 301 and right camera 302. In some implementations, the left and right cameras 301, 302 may be located on the sphere at an equator 370 of the sphere at a predetermined intercamera distance from one another. Although less accurate than locations in the top hemisphere 350, such a location may still provide improved results over camera model 200. A vertical axis 310 of rotation for the camera model may be a vertical axis 310 behind the point locations of left camera 301 and right camera 302 and equidistant to each. In some implementations, vertical axis 310 may pass through a center of the sphere. In some implementations, a vertical axis 310 of rotation may be a vertical axis 310 passing through the sphere 360 in front of or behind the center of the sphere 360. A horizontal axis 311 of rotation of the for the camera model may be a horizontal axis through the center of the sphere 360. In some implementations, a horizontal rotational axis 310 may be located behind a center of the sphere 360, as shown in FIG. 3b. In some implementations, horizontal rotational axis may be located below the center of the sphere 360. In some implementations, horizontal rotational axis may be located below and behind the center of the sphere 360. As illustrated in FIG. 3b, when rotated about vertical axis 310, left camera 301 and right camera 302 may travel around rotational circle 320. Placement of the horizontal axis 311 and vertical axis 310 as shown in FIGS. 3a and 3b are exemplary only. These axes may be adjusted to better correspond to human anatomy as necessary.

Camera model 300, as discussed above, may be described by camera parameters. Camera parameters may include model parameters, including information defining the intercamera distance, a model center, the locations of the left and right cameras 301, 302 with respect to a center of the model, location of the vertical axis 310 of rotation, the location of the horizontal axis 311 of rotation, and any other information required to fully or partially define the model. Camera parameters may further include orientation parameters. Camera orientation parameters may include a viewing angle comprising the horizontal angle and the vertical angle.

Camera parameters may further include an attitude of the camera model 300 and/or movement of the camera model 300. In some implementations, to accommodate for movement of a player's head, camera model 300 may permit attitude changes as well as movement away from an initial location. The attitude of the camera model 300 may include information defining rotation about a roll axis 313. As illustrated in FIGS. 3a and 3b, the roll axis 313 may pass through a center of the camera model 300. In some implementations, the roll axis 313 may pass through a different location of the camera model 300 to more accurately reflect the physiology of a user. A movement parameter may define movement of the camera model 300 center away from an initial location. A combination of attitude and movement parameters of the camera model may define tilting or twisting of the vertical and horizontal axes 310 and 311 away from an initial position. Viewing angles may be measured from the vertical and horizontal axes, as adjusted by the movement and attitude changes of the camera.

In operation, during gameplay, these camera angles may operate as follows. Changes in the horizontal angle may correspond to player head rotation to look left and right. Changes in the vertical angle may correspond to player head tilting to look up and down. Changes in the attitude may correspond to movements such as tilting the head, leaning forward, leaning backward, and other head movements that change the locational center of the head.

Capture module 120 may use alternate camera models as described above and differing rotational axes when performing scene capture. Rendering module 123 may use alternate camera models as described above as player or user camera model when rendering a stereoscopic image. It is not required that both the capture camera model and the player/user camera use the same camera model. A rendering camera model may be referred to herein as a user camera model and as a player camera model.

In some implementations, capture module 120 may alter a baseline pitch (i.e. vertical angle) of camera model 300 when performing a capture. As used herein, a baseline pitch refers to an angle of the camera model 300, rotated around horizontal axis 311, that is used as a neutral position for the camera model 300. For example, a baseline pitch of zero degrees would represent a camera model 300 arranged to look straight ahead, while a baseline pitch of negative thirty five degrees may represent a camera model 300 arranged to look down. A negative baseline pitch may be useful, for example, to capture a scene based on looking down at a table, while a positive baseline pitch may be useful, for example, to capture a scene based on looking up at the sky. In a camera model 300 that positions the cameras 301, 302 on a sphere 360, adding or subtracting pitch as a baseline position may alter the distance of the cameras 301, 302 to the vertical axis 310. Thus, for example, if the cameras 301, 302 are positioned in a top hemisphere 350 of the sphere 360, a positive baseline pitch, i.e., looking up, would move the cameras 301, 302 closer to the vertical axis 310, behind the cameras 301, 302, about which the cameras 301, 302 are rotated for capturing the scene. A negative baseline pitch, if the cameras 301, 302 are located in a top hemisphere 350, would serve to increase the distance to the vertical axis 310. Thus, the radius of the rotation circle 320 used by capture module 120 for rotation of the cameras 301, 302 may be determined by a predetermined pitch of the cameras.

Figure 4:
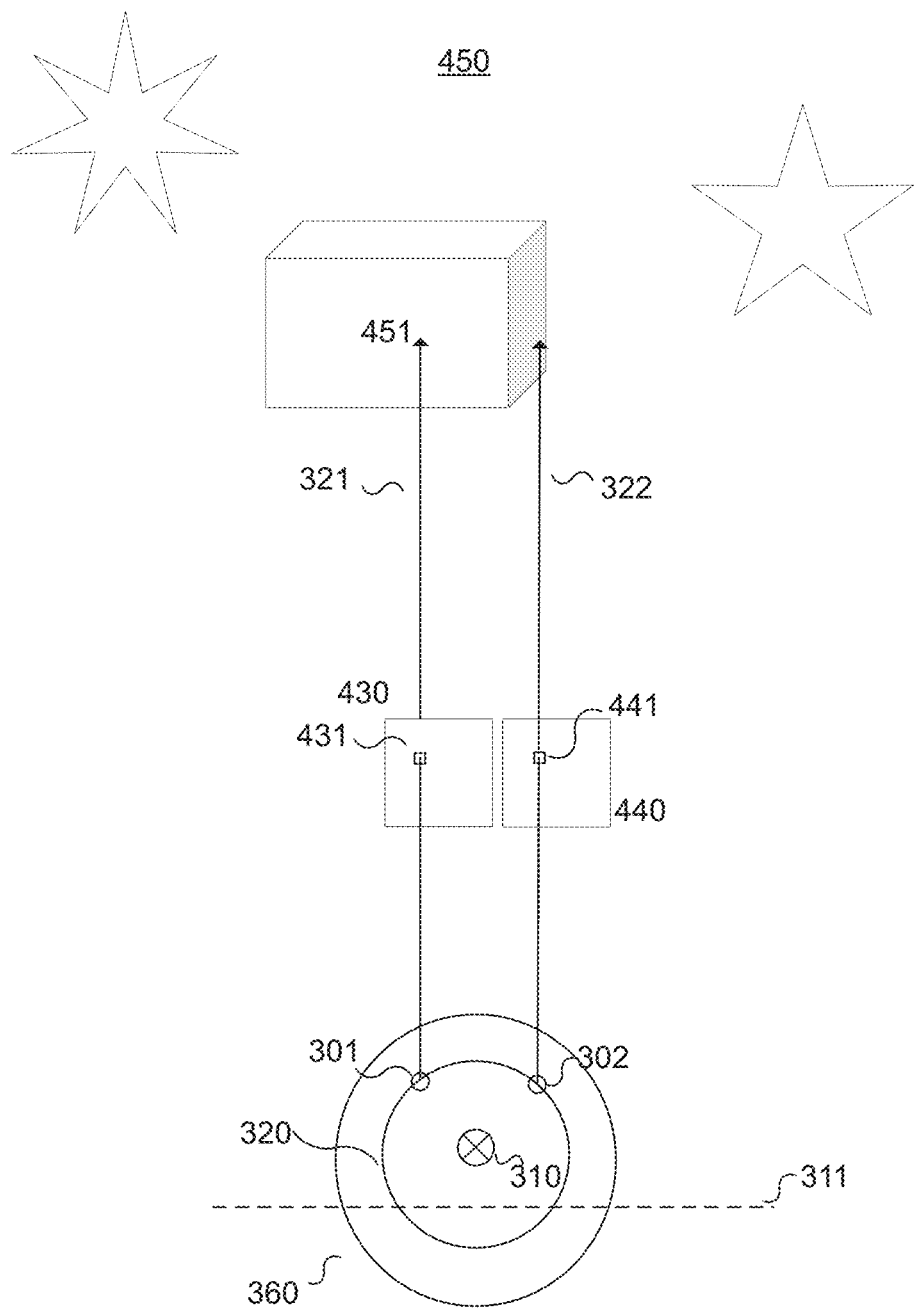
FIG. 4 illustrates a virtual scene capture process according to an implementation of the invention.

Returning now to FIG. 1, operation of capture module 120 is described in detail. The following discussion references camera model 300 as illustrated in FIG. 3 and FIG. 4 for exemplary purposes only. Camera model 200 of FIG. 2, or other camera models may be used for scene capture without departing from the scope of the invention. Capture module 120 may capture each scene twice, from view point of a left camera 301 and a right camera 302, representative of a viewer's eyes when the stereoscopic panorama is later rendered for stereoscopic viewing. The left camera 301 and the right camera 302 may be represented by a camera model as described above.

FIG. 4 illustrates an exemplary scene capture operation, as follows. Capture module 120 may capture the virtual scene 450 as a pair of cube map faces 430, 440 as follows. In a first orientation of the camera model 300, left camera

301 may capture texel data from the virtual scene for the texel location 431 that is directly in line with the viewing path 321 of left camera 301. Right camera 302 may capture texel data from the virtual scene for the texel location 441 that is directly in line with viewing path 322 of the right camera 302. In the orientation illustrated in FIG. 4, visual and distance information of object 451 may be captured and stored in the stereoscopic cube map at location 431 for the left eye and location 441 for the right eye. The locations 431 and 441 are associated with each other as occupying the same position within their respective cube map faces 430 and 440. The captured graphic information from the virtual scene may be captured from an object that is near to or far away from the cube map faces 430 and 440. For each location on the cube map faces 430 and 440, the captured graphical information corresponds to the portion of the virtual scene 450 determined by ray casting from the camera associated with the cube map face to an object in the virtual scene 450 at the camera's location, orientation, and attitude. Visual information values of the left camera texel and the right camera texel may be stored in the visual cube maps while camera distance information of each texel may be stored in the distance cube maps. The camera distance information of each texel may be stored in the camera distance cube map as a distance from the texel's location within the virtual scene to the camera capturing that texel.

Capture module 120 may continue to capture the virtual scene by rotating the viewing angle of the camera model 300, such that the respective viewing paths 321, 322 of each camera 301, 302 pass through each available location on cube map faces 430 and 440 to determine visual information and camera distance information for capture. Visual and distance information may be captured from the virtual scene 450 to determine a texel for each location in cube map faces 430 and 440. The camera model 300 may continue to be rotated through new orientations, capturing visual and distance information of each texel at each new orientation until each texel of the cube map faces 430 and 440 is captured. Camera model 300 may then be rotated through new orientations to capture visual and camera distance information for a texel corresponding to each location in the five other cube map faces. Progressing through all of the orientations corresponding to texels of the cube map, capture module 120 may capture both visual and distance data for each texel viewable from each camera of the camera model 300 at the camera model's location. Capture module 120 may capture larger or smaller numbers of texels, depending on a desired level of resolution and/or required detail.

In some implementations, additional stereoscopic panorama data sets may be captured for a camera location based on camera attitude changes and/or based on incremental camera movements. As described above, a stereoscopic panorama data set may be captured as a cube map by rotating the camera model 300 through differing orientations, e.g., by changing the horizontal and vertical angle of the camera model 300 without adjusting the attitude of the camera model 300. In some aspects of the invention, additional stereoscopic cube maps may be captured using camera model 300 attitude adjustments. For example, capture module 120 may capture a neutral attitude cube map, a leaning-to-the-left cube map, and a leaning-to-the-right cube map. A leaning-to-the-left cube map, for example, may include an attitude parameter indicative of head tilt to the left and a movement parameter indicative of location movement to the left. A leaning-to-the-right cube map, for example, may include an attitude parameter indicative of head tilt to the right and a movement parameter indicative of location movement to the right. These additional camera parameters may be indicative of camera adjustments associated with the movements caused by a user leaning to the left or the right. In some implementations, capture module 120 may capture any number of attitude adjusted cube maps as required for rendering purposes.

In some implementations, capture module 120 may be configured to compress camera distance information for storage in the camera distance cube map. Depth compression may be performed according to a camera distance of a texel.

In some implementations, for the texels of image elements greater than a predetermined threshold distance from the camera, the camera distance may be set to a maximum value, or clamped. For example, the depth of objects further than approximately 10 meters away from a viewer cannot be easily determined by a human based solely on stereo data. That is, at distances larger than approximately 10 meters, the offset of the eyes does not provide enough information to determine small difference in depth. Thus, camera distance data for image elements greater than the predetermined threshold may be clamped, e.g., set to a maximum value, to save memory. For texels of image elements closer than the predetermined threshold distance, precise camera distances may be stored in the camera distance cube map. In some implementations, a clamping depth may be set according to a maximum distance texel (e.g., the furthest texel from the camera). In some implementations, a clamping depth may be set according to an X %-maximum distance texel (e.g., the furthest texel of closest X % of all texels), where X may be a number between 95 and 100. In some implementations, a clamping depth may be chosen between the smaller of a predetermined threshold and a maximum distance or the X %-maximum distance texel.

The storage of precise distance values requires additional memory space. In some implementations, the precision of the stored camera distance values for each texel may be based on the magnitude of distance values of the texels.

In some implementations, camera distances image elements very close to the viewer, e.g., 0-1 meters, may be stored at a highest level of precision, camera distances in a close range, e.g., 1-4 meters, may be stored at a slightly lower level of precision, camera distances in an intermediate range, e.g., 5-10 meters, may be stored at a level of precision that is lower again, and camera distances in a far range, e.g., 10+ meters, may be stored at a lowest precision and/or set to a maximum value. Although four ranges are given as examples, camera distance precision may be altered according to any suitable number of predetermined ranges at any level of predetermined precision. Altering the precision of camera distance information based on a camera distance may serve to conserve system resources, e.g., reduce the overall memory footprint, while maintaining the highest quality images for objects that are closer to a viewer and thus require more detail.

In some implementations, altering the precision of the camera distance information may be achieved via the use of a nonlinear transformation. For example, camera distance values may be stored in the distance cube maps as the inverse of the actual distance. That is, each distance may be stored as one divided by the distance. When the inverse of the distance is stored in a fixed memory space, i.e., having a fixed number of decimal places, smaller distances are stored at greater precision. In some implementations, the nonlinear transformation may be applied to the camera distance values after accounting for the total depth range. For example, the camera distance values may be scaled according to the depth range of values (e.g., between the minimum and maximum distances for all texels). After scaling, the nonlinear transformation may be applied to provide the greatest storage precision for closer in texels.

In some implementations, capture module 120 may be configured to coordinate with rendering module 130 to implement distortion correction for the bottom and top faces of a stereoscopic cube map. In the operation of some camera models, points directly below and directly above location of the camera model may suffer from distortion. This distortion may be created because, based on the rotational geometry of the camera model in question, capture module 120 may fail to capture the texels directly above and directly below the camera model, creating a blind spot.

Capture module 120 may perform a distortion correction as follows. After capturing the entire stereoscopic cube map, capture module 120 may capture or generate a distortion correction image. In some implementations, the distortion correction image may include an additional capture of the scene in the downward and/or upward direction only from a point directly between the left and right cameras of the camera model. In some implementations, the distortion correction image may be determined by generating an additional mesh that corresponds only to the blind spot distortion area. The distortion correction image may be used by rendering module 123 to correct distortion errors, as described in greater detail below.

The foregoing description of the capture module 120 discusses the capture of a single cube map from a single camera model location. A single cube map may be used to implement video games and/or video/image viewing where the location of the player or viewer does not move around significantly. In alternative implementations, a plurality of cube maps may be captured by capture module 120 to permit the rendering Depth Module 122

Depth module 122 may be a software module executing on computer system 110 and/or user device 140. Depth module 122 may include program instructions configured to cause a processor 112 of computer system 110 and/or user device 140 to generate a depth buffer according to camera distances stored in the camera distance cube map.

As used herein, the term "depth buffer" refers to an array of depth values corresponding to the texels of a rendered image. Once rendered, all or some of the texels of the image may have depths associated with them. Such depths may be used, for example, when new or additional image elements are introduced into a scene. When a new image element is introduced, the depths of its texels may be compared to the depths of the rendered image texels at the location of the new image element. If the texels of the new image element are deeper than the texels of the rendered image, then they will be occluded by the texels of the rendered image and not display. If the texels of the new image element are shallower than the texels of the rendered image, then they will occlude the texels of the rendered image. In some instances, for example, where texels are intended to represent transparent objects, (e.g., glass, water, air, etc.) then the deeper texels may be only partially occluded. In such cases, the display of the deeper texels may be altered by the presence of the shallower texels. The depth buffer permits the introduction of additional elements in a scene without requiring the entire scene to be re-rendered. The rendering module 124, may compare the depth of the new element to the depths of the rendered image and any other elements near the new element to determine which elements are closer to the viewer and should therefore be rendered.

A depth buffer may be an information storage array containing a depth for each texel that is displayed. When an image is rendered for viewing, each texel in the rendered image may be selected by the image rendering module 123, as discussed in greater detail below. For each selected texel of the rendered image, depth module 122 may determine a depth value based on the information in the stored camera distance cube map. As discussed above, the camera distance cube map stores the distance of each texel from the camera. When the scene is rendered to create a viewing image (or two viewing images, one for the left eye and one for the right), depth module 124 may generate depth values for each of the texels in the rendered viewing image. Camera distances differ from depth values in a rendered scene, because depth values are measured from the image plane of the rendered scene, while camera distance values are measured from the viewing camera.

Depth buffers generated by depth module 122 may be used accommodate dynamic elements in the scene. Texel depths are required to determine which elements may be occluded, as discussed in greater detail below.

Image Rendering Module 123

Rendering module 123 may be a software module executing on computer system 110 and/or user device 140. Rendering module 123 may include program instructions configured to cause a processor 112 of computer system 110 and/or user device 140 to render a screen image from a stored stereoscopic panorama cube map, including a visual cube map and a distance cube map. Visual pixel values from the visual cube map may be used by rendering module 123 to generate two rendered images (left camera and right camera) for viewing. The rendered images, together may create a stereoscopic image suitable for viewing via various stereoscopic means, for example, via a stereoscopic headset.

Rendering module 123 may access the data of the stereoscopic cube map to render images of the scene to a viewer. Images of the virtual scene may be rendered, for example, during gameplay, during playback of a captured video, etc. As discussed above, data stored in the stereoscopic cube map represents an immersive surrounding stereoscopic panoramic view from a single camera model location. As the player camera rotates to new viewing angles and attitudes in the location, different images are rendered by rendering module 123 to represent the portion of the stereoscopic panorama being viewed by the user. The portion of the stereoscopic panorama being viewed may be rendered by rendering module 123 for stereoscopic display as a rendered stereoscopic image, including a left image and a right image.

In some implementations, the player camera may use a model analogous to the camera model used during stereoscopic capture. In alternative implementations, the player camera may use an alternative model to the capture camera model. A player camera may rotate and move through varying angles and positions during playback, as described above with respect to capture camera models. In some implementations, a player camera is intended to correspond to a virtual head of a viewer, and movement of a user's head during playback may be reflected in movements of the player camera. Thus, as a user turns their head, the player camera may rotate. As a user tilts or otherwise alters their head position, the player camera may follow suit. User head movements may be determined by appropriate hardware, including, for example, virtual reality headsets and may be interpreted by system module 130.

Rendering module 123 may obtain or otherwise determine a viewing angle and position of the player camera. The viewing angle and position of the player camera may be determined by system module 130 based on user inputs and transferred to rendering module 123. According to the viewing angle and position of the player camera, rendering module 123 may access the stereoscopic cube map, select the appropriate texels for rendering, and render the texels of the image.

Rendering module 123 may select texels for rendering according to the viewing angle and position of the player camera using an iterative method, for both a left eye image and a right eye image. For each texel location in the screen image to be rendered, rendering module 123 may select a texel from the visual stereoscopic cube map to occupy the texel image location. In some implementations, the selected texel maybe chosen as follows. Rendering module 123 may select an initial-choice texel from the cube map based on viewing angle alone, ignoring any attitude changes of the player camera model. Rendering module 123 may select the initial-choice texel based on an assumption that the player camera has altered a viewing angle but has not altered the attitude (i.e., viewing position) in comparison to baseline viewing position of the capture camera model. The selected initial-choice texel may be a texel of the cube map on the straight-line viewing path between the player camera viewing position at the determined viewing angle and the texel location in the image to be rendered. The initial-choice texel may be the texel on the viewing path having the smallest camera distance, as selected from the stereoscopic camera distance cube map. The initial-choice texel provides an initial "best guess." This "best guess" may be accurate when the object the texel is selected from is centered on the screen and the camera model is located in the same position as during the capturing phase.

The initial choice texel may then be reprojected into the actual player's camera based on both angle and attitude to give a reprojected screen position. A distance between the reprojected screen position of the initial choice texel and the screen position of the texel location for which a texel is sought may then be computed by rendering module 123 to determine a distance error. The distance error may then be combined with the camera distance value of the initial choice texel to select a nearby next-choice texel from the stereoscopic cube map. The next-choice texel may then be reprojected to the player camera at the current angle and position to determine the error distance between the next-choice pixel and the texel location. Next-choice texels may continue to be selected until a texel is found having a distance error value below a predetermined quality threshold.

The iterative method of texel selection may select the most optimal texel for display at each texel location of the rendered image for the current player camera and position. The number of iterations required may depend on the scene being rendered as well as hardware performance, i.e., CPU, GPU, heat, etc. The number of iterations required may also depend on how far the player camera has moved from the original capture position. In some scenes, an optimal texel may be selected after 0-2 iterations. In some scenes, an optimal texel may be selected after 10 or more iterations.

The iterative texel selection method described above represents one implementation of optimal texel selection. Alternative methods of selecting an optimal texel may be determined by those of skill in the art, and the invention is not limited to the above-described technique.

Once selected, depth module 122 may compute a depth of the selected optimal texel. Depth module 122 may compute the depth of the texel from the image plane, as discussed above.

As described above, each texel for the left and right rendered images may be selected based on a straight line between the location of the respective left and right cameras (i.e., the point at which all viewing paths intersect) and the texel location while the camera model is held at a constant viewing angle. Accordingly, the majority of the straight-line paths used for texel selection in this implementation may not be perpendicular to the camera plane.

In another implementation of the invention, each texel for the left and right rendered images may be selected based on a straight line between the location of the respective left and right cameras (i.e., the point at which all viewing paths intersect) and the texel location while the camera model is rotated through multiple orientations. In this implementation, the straight-line paths used for texel selection may each be perpendicular to the camera plane. This implementation mimics the capture method performed by capture module 120, described above.

As discussed above, when the player camera is in an identical position to the camera model during capture, and for objects directly in front of the camera, the initial-choice texel may be accurate, and iteration may not be necessary. As the player camera position is slightly altered due to head movements and rotation by the player, and for objects that are in the sides and corners of the player's vision, distortion may be introduced if iterative texel selection according to camera distances and a viewing angle is not performed.

The iterative method combined with the stored camera distance cube map may reduce distortions in the stereoscopic panorama that would otherwise be introduced when the player camera rotates and changes position. As the camera rotates and alters position, without the information of a camera distance cube map, distortions may be introduced that reduce the realism of the virtual scene. For example, when viewing a scene including multiple elements at different depths in real life, slightly different viewing angles and slightly different head positions will cause the scene elements to change position slightly with respect to one another. Rendering these altered locations correctly may be achieved through information about the camera distances of each object. After player camera movement and rotation, a texel of an element that was previously visible may become obscured by another, closer texel.

In some implementations, after player camera movement and rotation, an uncaptured portion of a scene may become visible to a user. As discussed above, in some scene capture implementations, attitude and movement changes of the capture camera are not used. Consequently, an attitude change or movement of a player camera may result in an uncaptured portion of a scene becoming visible. For example, a player camera movement that mimics a user shifting their head to the side several inches may reveal the side of an object that was previously hidden. Because the scene capture in this case did not account for attitude changes, information for the newly revealed surface may not exist in the stereoscopic panorama data set. In such cases, rendering module 123 may select a reference texel nearby to the newly revealed area and generate replacement texels for the newly revealed area.

In some implementations, as discussed above, scene capture may be performed with camera model attitude changes. In such implementations, rendering module 123 may access the additionally captured stereoscopic cube maps to render a scene for an attitude adjusted player camera.

In some implementations, rendering module 123 may be configured to minimize distortions in the stereoscopic rendering of the scene above and below the viewpoint of the user through the use of a distortion correction image captured by capture module 120. Rendering module 123 may make use of the distortion correction image captured or generated by the capture module 120 for distortion minimization. When rendering a downward facing scene, rendering module 123 may select a distortion correction area for distortion correction. An image area for distortion correction may be selected, for example, based on a predetermined selection of an image area that is frequently distorted. Rendering module 123 may select texels for rendering in the distortion correction area as discussed above, using the iterative method. Rendering module 123 may further compare the results of the iterative method determined image to the distortion correction image. Based on the comparison, rendering module 123 may select texels for the distortion correction area according to whether the iteratively rendered texels or the texels selected from the distortion correction image have the least error. The rendering module 123 may rerender portions of the left eye image and of the right image with portions of the distortion correction image to minimize the distortion.

The data from the distortion correction image may fill any image gaps existing in the original stereoscopic capture. The data from the distortion correction image may also be a closer fit than the original capture for the scene just below the viewer.

As noted above, vertical distortion reduction may be implemented for scenes both above and below a user. In some implementations, this distortion correction may be used for objects close to the viewer, e.g., approximately less than 10 meters away. Outdoor environments containing sky, which is much further than 10 meters away, may thus not suffer any from distortions correctable via this method. Indoor environments, or scenes with objects directly above, may use this technique for capturing and rendering the scene above.

Dynamic Element Module 124

Dynamic element module 124 may be a software module executing on computer system 110 and/or user device 140. Dynamic element module 124 may include program instructions configured to cause a processor 112 of computer system 110 and/or user device 140 to render dynamic elements within the rendered image. In some implementations, dynamic element module 124 may be a sub-module of rendering module 123. As used herein, dynamic elements refer to visual elements of a scene that exhibit movement about the scene. Dynamic elements may include moving objects, animals, creatures, avatars, particle systems and effects, shadows, lighting, and other aspects of gameplay that are not fixed in place. In some implementations, dynamic elements may further include dynamic portions of otherwise fixed elements, such as tree branches moving in the wind or a flag on a flag pole moving in the wind.

Dynamic gameplay elements may be rendered with reference to the depth buffer generated by depth module 122. Dynamic element module 124 may obtain a depth and an image location of a dynamic element from system module 130. Dynamic element module 124 may use the location information of the dynamic element to determine where to render the dynamic element within the rendered image. Dynamic element module 124 may use the depth information of the dynamic element in a comparison with the depth buffer of the rendered image to determine whether the dynamic element, or portions of the dynamic element, should be occluded by portions of the rendered image and therefore not included in the image rendering.

In some implementations, dynamic element module 124 may determine a depth and a location for each pixel of a dynamic element. Dynamic element module 124 may obtain a position of the dynamic element. The position may be specified, for example, by a distance and direction from a player camera baseline position or other information defining the position of the dynamic element. Based on the position information of the dynamic element, dynamic element module 124 may determine a depth and location of the dynamic element within the rendered image. As described above, dynamic element module 124 may determine, based on the depth and location of the dynamic element, whether to render any or all of the dynamic element.

Aspects of the invention permit the rendering of dynamic elements without distortion. In some conventional capture and rendering techniques, rendered stereoscopic images of a virtual scene may include distortion. Such distortion may be acceptable to a user and easy to ignore where no dynamic elements are present. The introduction of dynamic elements to the virtual scene may cause the distortion in the rendered stereoscopic images to be significantly more noticeable. That is, the introduction of dynamic elements to a conventionally rendered scene may increase a user's perception of the distortion that is present in the scene. As described above, the use of a captured camera distance map during stereoscopic image rendering may reduce or eliminate distortions in the stereoscopic rendering of the virtual scene. Because distortions in the stereoscopic image rendering are reduced or eliminated by aspects of the invention, the introduction of dynamic scene elements may not increase a user's perception of distortion in the rendered stereoscopic images as a whole. Depth buffers produced for each left eye image and right eye image permit a dynamic element to be introduced to the images and rendered without increasing the perception of distortive effects. That is, in the player's perception, the dynamic elements may pass in front of or behind background or scene elements smoothly. Decisions regarding whether the dynamic elements pass in front of or behind background or scene elements may be made based on information stored in the depth buffers.

Output Module 125

Output module 125 may be a software module executing on computer system 110 and/or user device 140. Instructions of output module 125 may be executed to cause computer system 110 and/or user device 140 to output the rendered left and right eye images to a display system 190. As previously noted, display system 190 may include one or more display screens used to display stereoscopic images. The display system 190 may further include computer storage devices and computer processing devices required to receive rendered images and to cause their display on the one or more display screens. Accordingly, output module may cause the display of the right eye image and the left eye image on one or more display screens to produce a stereoscopic effect for the viewer.

Although each is illustrated in FIG. 1 as a single component, computer system 110 and user device 140 may each include a plurality of individual components (e.g., computer devices) each programmed with at least some of the functions described herein. In this manner, some components of computer system 110 and/or user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, flash memory, or other storage media for storing computer-executable instructions and/or data.

The various components illustrated in FIG. 1 may be coupled to at least one other component, intermittently or continuously, via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing figures, different numbers of entities than those depicted may be used. Furthermore, according to various implementations, the components described herein may be implemented in hardware and/or software that configure hardware.

Figure 5:
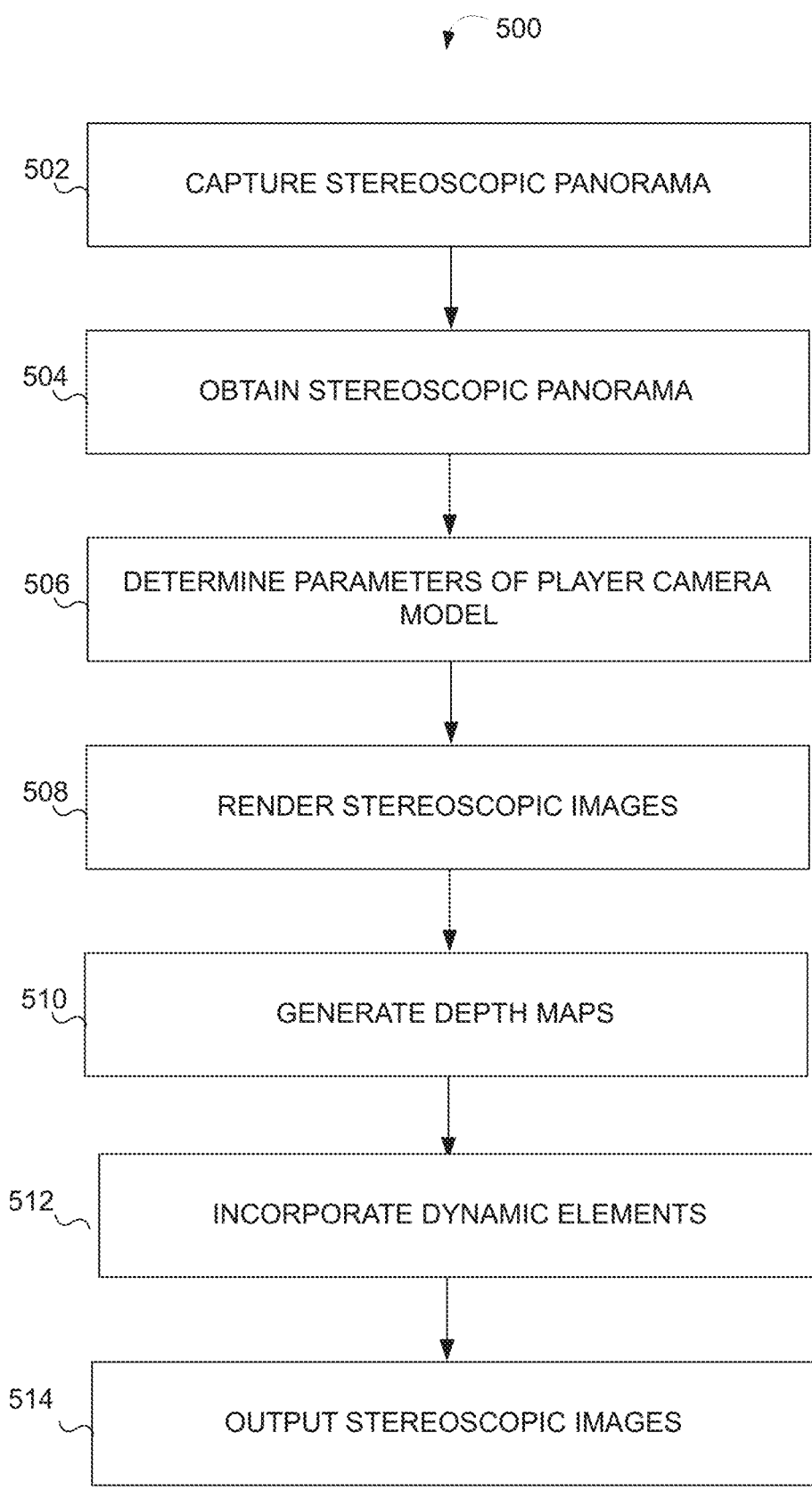
FIG. 5 depicts a process of capturing and rendering virtual scene data, according to an implementation of the invention.

FIG. 5 depicts a process 500 of capturing a stereoscopic panorama and rendering corresponding stereoscopic images, according to an implementation of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, process 500 may include capturing a stereoscopic panorama data set. The captured stereoscopic panorama data set may include left and right eye visual and camera distance data. The captured stereoscopic panorama data may be stored, in some implementations as one or more cube maps. In alternative implementations, captured stereoscopic panorama data may be stored in alternative image data structures.

Capture module 120 may capture a stereoscopic panorama data set previously described, with respect to FIG. 4. Capture module 120 may rotate the camera model around the camera model vertical axis and the camera model horizontal axis to capture visual data and camera distance data for six texel arrays, each corresponding to the face of a cube surrounding the camera model, to create a stereoscopic cube map.

In some implementations, capture module 120 may compress the camera distance information for storage in the camera distance cube map. Depth compression may be performed according to a camera distance of a texel. In some implementations, the amount of memory allocated for the storage of the camera distance information for each texel may be determined according to a camera distance of the texel. Texels with smaller camera distances may have larger amounts of memory allocated for camera distance values, thus permitting a greater precision in the data at closer distances. Texels with larger camera distances may have smaller amounts of memory allocated, thus saving space where precision may not contribute to the quality of the final image. In alternative implementations, a nonlinear transformation may be performed on camera distance information to provide greater precision at closer distances. It may contribute significantly to image quality to store very precise camera distance values for objects close to the camera, where human bifocal depth perception is at its strongest. For objects far from the camera, e.g., greater than 10 meters, it may not contribute to image quality to store such precise information. That is, human bifocal depth perception cannot perceive the difference in distance between an object 10 meters away and an object 10.01 meters away, whereas, for objects 0.1 meters away, a human can easily determine the difference between 0.1 and 0.11 meters.

In some implementations, capture module 120 may capture one or more distortion correction images. Distortion correction images may be captured from a single viewpoint directly between the left camera and right camera of the camera model, facing either directly up or directly down. This capture may be used by rendering module 123 to correct distortion errors in rendered stereoscopic images.

Capture module 120 may store the stereoscopic panorama data set. The stereoscopic panorama data set may be stored in a computer storage device local to computer system 110, in a remote system, and/or in a cloud system. The stereoscopic panorama data set may be stored as a stereoscopic panorama cube map.

In an operation 504, process 500 may include obtaining a stereoscopic panorama data set. A system to be used for display of rendered images corresponding to the stereoscopic panorama may obtain the stereoscopic panorama data set. In some implementations, the system to be used for display may include user device 140. User device 140 may access a storage module to obtain a stereoscopic panorama data set. In some implementations, the stereoscopic panorama data set may be obtained by the same system used for capture. Because capture and rendering may occur at separate times, even if the same system is used for both, it may be necessary to store the stereoscopic panorama data set and later access a storage device to obtain it.

In an operation 506, process 500 may include determining parameters of a player camera model. In some implementations, rendering module 123 may communicate with a system module 130 to directly determine parameters of a player camera model. As discussed above, system module 130 may control gameplay and/or playback aspects of the system. Such aspects may include player movement, player view change, player viewing angle change, etc. System module 130 may provide information to rendering module 123 that may permit rendering module 123 to determine player camera model parameters. For example, system module 130 may explicitly communicate the model parameters and/or communicate relative changes to previous model parameters. In some implementations, rendering module 123 may determine parameters of a player camera model based on other factors, including, for example, previous player camera model parameters and any other inputs received by rendering module 123. Player camera parameters may include, as discussed above, a player camera position, location, attitude, viewing angle, axes of rotation and their locations, and intercamera distance.

In an operation 508, process 500 may include rendering stereoscopic images. A left eye image and a right eye image may be rendered by rendering module 123. Rendering module 123 may perform the rendering based on player camera parameters, including at least location, attitude, and viewing angle. Based on the player camera parameters, rendering module 123 may determine a location and orientation of each of the left eye and right eye cameras. As discussed above, rendering module 123 may select texels from the stereoscopic panorama data set based on an iterative process to determine the best texel (i.e., the texel having the least error) at the location in the image plane for which a texel is being selected. The iterative process may render a left eye image according to the left camera visual data and the left camera distance data, based on the location, the attitude, and the viewing angle of the player camera model representative of the player's head. The iterative process may render the right eye image according to the right camera visual data and the right camera distance data, based on the location, the attitude, and the viewing angle of the player camera model representative of the player's head.

In an operation 510, process 500 may include generating depth buffers for the left eye image and the right eye image. The right camera depth buffer and the left camera depth buffer may correspond to the right eye image and the left eye image, respectively. Each depth buffer may include texel depth information, defining the depth of the texel from its location within a virtual scene to the corresponding left or right camera. Depth buffers may be computed by depth module 122 during the rendering process.

In an operation 512, process 500 may include incorporating dynamic elements into rendered stereoscopic images. Dynamic element module 124 may obtain imaging information of a dynamic scene element. Imaging information of a dynamic scene element may include visual information, depth information, and location information. Imaging information may be obtained, for example, from system module 130 in some implementations, which may supply the dynamic element imaging information as game play information. In some implementations, imaging information may be obtained from dynamic element module 124 itself. That is, dynamic element module 124 may receive information about a dynamic element, including potential movement of the dynamic element within the scene. Dynamic element module 124 may, in some cases, determine movement of the dynamic scene element to obtain imaging of the dynamic scene element.

Dynamic element module 124 may determine an image placement location of the dynamic scene element for both the left eye image and the right eye image, according to the dynamic scene element location information obtained. Dynamic element module 124 may then compare the depth information of the dynamic scene element to the depth information stored in the depth buffer at the image placement location. If the depth information of the dynamic scene element at the placement information indicates that the dynamic scene element is deeper, or further away from the image plane, than the texels of the image rendered based on the stereoscopic panorama data set, then dynamic element module 124 may make a determination not to render the dynamic scene element. That is, if the dynamic element is behind an object in the image, the player should not see it. If the depth information of the dynamic scene element at the placement information indicates that the dynamic scene element is shallower, or closer to the image plane, than the texels of the image rendered based on the stereoscopic panorama data set, dynamic element module 124 may make a determination to render the dynamic scene element. That is, dynamic elements closer to the player than scenery objects should be seen by the player. In some implementations, portions of the dynamic element may be occluded by scene elements while portions are visible to the player. Dynamic element module 124 may perform the depth comparison for both left eye and right eye images to determine whether or not to occlude the dynamic element in the left eye image and the right eye image.

Dynamic element module 124 may further determine how to render the dynamic scene element based on movement. Dynamic element module 124 may obtain subsequent imaging information of a dynamic scene element. That is, as the object represented by the dynamic scene element is determined to move, e.g., by system module 130 and/or dynamic element module 124, dynamic element module may make a new determination about how to render the dynamic scene element based on the subsequent imaging information. The subsequent imaging information may include a second location for the dynamic scene element, and dynamic element module 124 may perform the steps of incorporating the dynamic element into the left and right eye images based on the second location. In some implementations, the subsequent imaging information may further include second visual information and second depth information. Thus, dynamic element module 124 may be configured to determine rendering of dynamic elements within the rendered left eye and right eye images, while accounting for occlusion of the dynamic elements and the scene, based on a comparison between a depth of the dynamic elements and depth buffers of the left eye and right eye images.

In an operation 514, process 500 may include outputting stereoscopic images for display. Output module 125 may be configured to output the rendered left eye image and the rendered right eye image to a display system. The display system may receive the rendered images and display them on one or more screens to create a stereoscopic effect for a viewer.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of rendering images captured from virtual scene data for virtual reality display, the method being implemented in a computer system having one or more physical processors programmed with computer program instructions that, when executed by the one or more physical processors, cause the computer system to perform the method, the method comprising:

storing, by the computer system, a plurality of cube maps representative of virtual scene data representing a computer graphical scene, the plurality of cube maps including first camera visual data stored as a first visual cube map, first camera distance data stored as a first depth cube map, second camera visual data stored as a second visual cube map, and second camera distance data stored as a second depth cube map;

establishing, by the computer system, a camera model associated with a virtual location having a first camera and a second camera, wherein the camera model is within the computer graphical scene and the first camera and the second camera are configured to rotate together around horizontal and vertical axes;

determining, by the computer system, a location of the camera model within the computer graphical scene corresponding to the virtual location, and a viewing angle of the camera model;

rendering, by the computer system, at least one image by selecting graphic units from the first camera visual data according to the first visual cube map and corresponding depth data in the first depth cube map, and from the second camera visual data according to the second visual cube map and corresponding depth data in the second depth cube map, and according to viewing paths between the camera model and the first visual cube map and the second visual cube map based on the location and the viewing angle of the camera model; and causing, by the computer system, display of the at least one image to produce a three dimensional effect.

2. The method of claim 1, wherein rendering the at least one image further includes generating, by the computer system, at least one camera depth buffer including depth information of a plurality of graphic units of the at least one image.

3. The method of claim 1, further comprising:
obtaining, by the computer system, imaging information of a dynamic scene element configured to exhibit movement within the computer graphical scene, the imaging information including visual information, depth information, and location information;
determining, by the computer system, a rendering location in the at least one image of the dynamic scene element;
comparing, by the computer system, depth information of the dynamic scene element to at least one camera depth buffer at the rendering location; and
determining, by the computer system, to render the dynamic scene element in the at least one image at the rendering location based on comparing the depth information of the dynamic scene element to the at least one camera depth buffer at the rendering location.

4. The method of claim 3, wherein rendering the at least one image includes rendering the dynamic scene element in the at least one image at the rendering location according to determining to render the dynamic scene element in the at least one image.

5. The method of claim 3,
wherein determining to render the dynamic scene element in the at least one image includes determining to render a first portion of the dynamic scene element in the at least one image at the rendering location based on the comparison between the depth information of the dynamic scene element to the at least one camera depth buffer at the rendering location and determining to not render a second portion of the dynamic scene element in the at least one image at the rendering location based on comparing the depth information of the dynamic scene element to the at least one camera depth buffer at the rendering location,
wherein rendering the at least one image includes rendering the first portion of the dynamic scene element in the at least one image at the rendering location according to determining to render the first portion of the dynamic scene element in the at least one image.

6. The method of claim 3, further comprising:
obtaining, by the computer system, second location imaging information of the dynamic scene element, the second location imaging information including second location visual information, second location depth information, and second location information;
determining, by the computer system, a second rendering location in the at least one image of the dynamic scene element;
comparing, by the computer system, the second location depth information of the dynamic scene element to the at least one camera depth buffer at the second rendering location; and
determining, by the computer system, to render the dynamic scene element in the at least one image at the second rendering location based on comparing the second location depth information of the dynamic scene element to the at least one camera depth buffer at the second rendering location.

7. The method of claim 1, wherein a precision of individual values of the first camera distance data and the second camera distance data is determined according to magnitudes of the individual values.

8. The method of claim 1, wherein an axis of rotation for determining the viewing angle of the camera model is located behind and equidistant from the first camera and the second camera.

9. The method of claim 1, further comprising:
selecting the graphic units from the first camera visual data by selecting & the graphic units according to a first smallest camera distance on a viewing path between the first camera and a first visual cube map location; and
selecting the graphic units from the second camera visual data by selecting the graphic units according to a second smallest camera distance on a viewing path between the second camera and a second visual cube map location.

10. A system of rendering stereoscopic images captured from virtual scene data for virtual reality display, the system comprising:
a computer system comprising one or more physical processors programmed by computer program instructions that, when executed, cause the computer system to:
store a plurality of cube maps representative of virtual scene data representing a computer graphical scene, the plurality of cube maps including first camera visual data stored as a first visual cube map, first camera distance data stored as a first depth cube map, second camera visual data stored as a second visual cube map, and second camera distance data stored as a second depth cube map;
establish a camera model associated with a virtual location having a first left camera and a second camera, wherein the camera model is within the computer graphical scene and the first camera and the second camera are configured to rotate together around horizontal and vertical axes;

determine a location of the camera model within the computer graphical scene corresponding to the virtual location, and a viewing angle of the camera model;

render at least one image by selecting graphic units from the first camera visual data according to the first visual cube map and corresponding depth data in the first depth cube map, and from the second camera visual data according to the second visual cube map and corresponding depth data in the second depth cube map, and according to viewing paths between the camera model and the first visual cube map, and the second visual cube map based on the location and the viewing angle of the camera model; and cause display of the at least one image to produce a three dimensional effect.

11. The system of claim 10, wherein the computer system is further programmed to render the at least one image by generating at least one camera depth buffer including depth information of a plurality of graphic units of the at least one image.

12. The system of claim 10, wherein the computer system is further programmed to:

obtain imaging information of a dynamic scene element configured to exhibit movement within the computer graphical scene, the imaging information including visual information, depth information, and location information;

determine a rendering location in the at least one image of the dynamic scene element;

compare the depth information of the dynamic scene element to at least one camera depth buffer at the rendering location; and determine to render the dynamic scene element in the at least one image at the rendering location based on comparing the depth information of the dynamic scene element to the at least one camera depth buffer at the rendering location.

13. The system of claim 12, wherein the computer system is further programmed to render the at least one image by rendering the dynamic scene element in the at least one image at the rendering location according to determining to render the dynamic scene element in the at least one image.

14. The system of claim 12, wherein the computer system is further programmed to:

determine to render the dynamic scene element by determining to render a first portion of the dynamic scene element in the at least one image at the rendering location based on comparing the depth information of the dynamic scene element to the at least one camera depth buffer at the rendering location, and determine to not render a second portion of the dynamic scene element in the at least one image at the rendering location based on comparing the depth information of the dynamic scene element to the at least one camera depth buffer at the rendering location.

15. The system of claim 12, wherein the computer system is further programmed to:

obtain second location imaging information of the dynamic scene element, the second location imaging information including second location visual information, second location depth information, and second location information;

determine a second rendering location in the at least one image of the dynamic scene element;

compare the second location depth information of the dynamic scene element to the at least one camera depth buffer at the second rendering location; and determine to render the dynamic scene element in the at least one image at the second rendering location based on comparing the second location depth information of the dynamic scene element to the at least one camera depth buffer at the second rendering location.

16. The system of claim 10, wherein a precision of individual values of the first camera distance data and the second camera distance data is set according to magnitudes of the individual values.

17. The system of claim 10, wherein an axis of rotation for determining the viewing angle of the camera model is located behind and equidistant from the first camera and the second camera.

18. The system of claim 10, wherein the computer system is further programmed to select the graphic units from the first camera visual data by selecting the graphic units according to a first smallest camera distance on a viewing path between the first camera and a first visual cube map location; and to select the graphic units from the second camera visual data by selecting the graphic units according to a second smallest camera distance on a viewing path between the second camera and a second visual cube map location.

19. A non-transitory computer readable medium storing computer instructions to be executed by a processor to perform a method of rendering images captured from virtual scene data for virtual reality display, the method being implemented in a computer system having one or more physical processors programmed with computer program instructions that, when executed by the one or more physical processors, cause the computer system to perform the method, the method comprising:

storing, by the computer system, a plurality of cube maps representative of virtual scene data representing a computer graphical scene, the plurality of cube maps including first camera visual data stored as a first visual cube map, first camera distance data stored as a first depth cube map, second camera visual data stored as a second visual cube map, and second camera distance data stored as a second depth cube map;

establishing, by the computer system, a camera model associated with a virtual location having a first camera and a second camera, wherein the camera model is within the computer graphical scene and the first camera and the second camera are configured to rotate together around horizontal and vertical axes;

determining, by the computer system, a location of the camera model within the computer graphical scene corresponding to the virtual location, and a viewing angle of the camera model;

rendering, by the computer system, at least one image by selecting graphic units from the first camera visual data according to the first visual cube map and corresponding depth data in the first depth cube map, and from the second camera visual data according to the second visual cube map and corresponding depth data in the second depth cube map, and according to viewing paths between the camera model and the first visual cube map and the second visual cube map based on the location and the viewing angle of the camera model; and causing, by the computer system, display of the at least one image to produce a three dimensional effect.

* * * * *

UNITED STATES PATENT AND TRADEMARK OFFICE
CERTIFICATE OF CORRECTION

PATENT NO. : 10,957,011 B2
APPLICATION NO. : 16/502920
DATED : March 23, 2021
INVENTOR(S) : Edwards et al.

It is certified that error appears in the above-identified patent and that said Letters Patent is hereby corrected as shown below:

In the Claims

Claim 9, Column 24, Line 39:
"data by selecting & the graphic units according to a first"
Should read:
--data by selecting the graphic units according to a first--

And

Claim 10, Column 24, Line 63:
"location having a first left camera and a second"
Should read:
--location having a first camera and a second--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*